Patented Sept. 5, 1939

2,171,882

UNITED STATES PATENT OFFICE 2,171,882

UREA FORMALDEHYDE RESINS

Oskar R. Ludwig, Philadelphia, Pa., assignor to The Resinous Products & Chemical Company, Philadelphia, Pa.

No Drawing. Application April 30, 1937, Serial No. 139,919

5 Claims. (Cl. 260—29)

This invention relates to improved paint, varnish, and lacquer resins of the urea-formaldehyde type and to resins and coating compositions embodying such resins with other natural or synthetic resins or other paint, varnish or lacquer ingredients. It also pertains to the process of preparing said urea-formaldehyde resins.

In application Serial No. 95,345 filed August 13, 1936, of which this application is a continuation-in-part, a process is disclosed for preparing an organic solvent soluble urea-formaldehyde condensation product which, in general, comprises condensing urea and formaldehyde in the absence of water and in the presence of a volatile alcoholic solvent and a very small amount of a volatile acid catalyst, by heating the reaction mixture for a relatively long time (10 to 15 hours) under such conditions that the catalyst and water split out during condensation are volatilized and distilled out of the reaction mixture as the condensation proceeds.

The present process is a modification of that disclosed in the parent application by which aqueous formaldehyde can be used at the start of the reaction. This is accomplished by condensing urea and formaldehyde in aqueous solution in the presence of a volatile alcoholic solvent and a very small amount of a volatile acid catalyst and at an intermediate stage of condensation, lowering the temperature to a point at which the rate of reaction is substantially diminished and by vacuum distillation, separating the water introduced at the beginning of the reaction. Thereafter the temperature is again raised to reaction temperature and water of reaction removed as formed with part of the alcoholic solvent until substantially two mols of water of reaction is removed for each mol of urea added.

In carrying out the process the following procedure is recommended. The proper amount of urea is rapidly dissolved by heating and stirring in a mixture of a neutral or slightly alkaline aqueous solution of formaldehyde and alcohol. The clear solution is heated to refluxing, care being taken that the exothermic heat of the reaction is not permitted to greatly raise the temperature. Then the proper amount of volatile acid is added and refluxing continued for a short time. The temperature is then lowered to below 80° C. and the mixture distilled in vacuum to remove the water introduced by the aqueous formaldehyde solution together with a part of the solvent which, however, is replaced by the same amount of anhydrous solvent. At a temperature of from 70–80° C. and a pressure of 200–400 mm. this removal of water requires six to ten hours. The dehydrated mixture is then refluxed under atmospheric pressure, the water and part of the alcohol being distilled off and collected. The alcohol removed from the reaction mass with the water should be replaced with anhydrous alcohol. Removal of two mols of reaction water for each mol of urea will require an additional heating period of approximately ten to fifteen hours, although in some instances shorter heating periods can be used.

The volatile acid catalysts employed in the process are acids which themselves boil at a temperature below 120° C. or which by chemical reaction during condensation form compounds such as esters that will volatilize at such temperatures. The actual amount of catalyst to be used will vary, depending upon its acidity and catalytic strength. It is essential that only such quantities be added as will produce but a mild catalyzing effect. As indicated above, the complete removal of water of reaction in accordance with this process requires heating periods of approximately ten to fifteen hours at a temperature above the boiling point of water. Unless a very small amount of catalyst is used, a lengthy heat treatment at such temperatures would gel the resin and render it unfit for coating compositions. With formic acid, which is the preferred catalyst, the optimum amount has been found to be 0.06% based on the total weight of starting materials (urea, dry formaldehyde, and alcohol). A maximum of 0.1% can be used. With hydrochloric acid, a stronger acid, the optimum amount was found to be 0.003%, with the maximum permissible between 0.004% and 0.005%. With acetic acid it was found that in the neighborhood of 1.5% is needed. In general, it can be said that the amount of catalyst that can be used is that quantity which will not cause gelling of the resin when the reaction mixture is heated to the boiling temperature of n-butyl alcohol, 117° C., over a period of approximately ten hours. For best results the acid catalyst is not added until after some reaction has taken place, and preferably it should not be added until the reaction mass has reached the methylol urea stage. At the beginning of condensation the reaction mass is preferably neutral or slightly alkaline.

The reaction is best carried out under atmospheric pressure and at the boiling point of the mixture. It is therefore desirable to use as the solvent an alcohol that boils near the boiling point of water, preferably between 100° and 120° C. The butyl alcohols, particularly n-butyl alcohol, is preferred, but ethyl, propyl and the amyl alcohols under suitable conditions, can be used. Methyl alcohol is too low boiling to be practical. With ethyl and the propyl alcohols, the reaction is somewhat slow because of their low boiling points, but this defect can be overcome by the use of pressure. The boiling point of n-amyl alcohol is dangerously near the decomposition temperature of the urea-formaldehyde resins, but with caution and the use of vacuum, it can be used. With alcoholic solvents boiling between about 78° C. and 137° C., the process can be carried out at the boiling temperature of the mixture. When higher boiling alcohols are used, the temperatures must be kept below their boiling points, preferably below 120° C., and some other means, such as passing an inert gas through the reacting mixture, can be used to assist the removal of water as rapidly as formed. When using alcohols such as cyclohexanol and the mono ethers of ethylene or diethylene glycol, some means such as blowing should be used to insure the rapid and complete removal of the water.

While the reaction may be applied to urea and formaldehyde used in a ratio of one mol of urea to two mols of formaldehyde, an excess of formaldehyde is desired, in order to obtain more stable, clear condensation products. Preferably 2.5 mols of formaldehyde to one mol of urea is used. In place of urea and formaldehyde as starting materials, an initial addition product, dimethylol urea, to which additional formaldehyde may be added is desired, may be employed.

The following example is given to illustrate the invention. To 100 lbs. of a neutral 37% solution of formaldehyde in water 60 lbs. of n-butonol and 28.3 lbs. of urea are added. Over a period of from 15–25 minutes the mixture is heated from about 25° C. to 94–96° C. at which temperature the clear solution boils. This temperature is maintained while refluxing for 10–15 minutes. 0.07 lb. of formic acid is then added and refluxing continued at atmospheric pressure for ½–1 hour. The boiling mixture is then cooled to 70–75° C., while the pressure is reduced accordingly to keep the mixture boiling. This temperature is maintained while distilling under a pressure of 400–200 mm. until the water, introduced by the aqueous formaldehyde, is distilled off simultaneously with a part of butanol, the water being collected and the butanol returned to the reaction mixture. When 63 lbs. of water has been collected which requires normally a period of from 6–10 hours, the vacuum is released, the temperature raised to 100–105° C., and the distillation continued under atmospheric pressure as the temperature gradually rises to 115–117° C. Water formed during the reaction and part of the butanol are continuously distilled out of the reaction mixture and condensed, the water being collected and the butanol returned to the reaction mixture. When 17 lbs. of water has been collected and one volume of the resin solution is miscible with about 4 to 8 volumes of toluol, removal of water and resinification are complete. Normally this will require a period of from 12–14 hours. The clear neutral product obtained contains about 58% solids and is stable. A 50% resin solution in butanol has a relatively high viscosity (O to S according to the Gardner-Holdt scale). It is miscible with monohydric alcohols in any ratio, almost completely soluble in the common esters and partially miscible with aromatic and aliphatic hydrocarbons.

From this example and the information given above, it will be apparent to those skilled in the art how the process can be carried out with other volatile catalysts and other alcoholic solvents. It will also be apparent that the urea may be partially replaced by thiourea or other urea derivatives and that the formaldehyde may be substituted, partially, by other aldehydes, such as acetaldehyde and benzaldehyde. It will also be apparent that mixture of alcoholic solvents may be used instead of a single alcohol.

The resin solutions prepared according to the present invention form hard, light-fast films, especially when subjected to elevated baking temperatures. They may be used by themselves in coating compositions or may be blended with other resins, particularly those formed from polyhydric alcohols (glycerol) and polybasic acids (phthalic) whether or not modified by drying oils (linseed) or non-drying oils (castor) or their fatty acids. Such coatings bake at relatively low temperatures (80° C.) to extremely hard, resistant, glossy films of excellent color retention.

The resin film hardens slowly at room temperature but rapidly at elevated temperature. Hardening can be accelerated by the addition of an acid catalyst just prior to application of the film. It is frequently necessary to plasticize the resin in order to overcome its brittleness. Common lacquer plasticizers such as raw or blown castor oil, the esters of phthalic acid (dibutyl phthalate), tricresyl phosphate, and sebacic acid esters, such as the glycerol and butyl esters, whether or not modified with the hereinbefore mentioned oils or their fatty acids, may be used. The fact that the new resin becomes very hard on baking and aging makes it very valuable as an ingredient in alkyd resin enamels and nitrocellulose or cellulose acetate lacquers, particularly when these enamels or lacquers are to be used as coatings for metal, as in automobile and refrigerator finishes. The resin may also be used as a binding material in molded or laminated resinous products and as an adhesive, as, for instance, in the preparation of plywood.

If, in the herein disclosed process a non-volatile catalyst that is neutralized and separated from the resin after the reaction is completed, is substituted for the volatile catalyst, the product obtained will be a substantial improvement over previously known resins. But it will not embody the complete stability that characterizes resins made with a volatile catalyst.

By the term "a volatile catalyst", as used in the following claims, is meant a catalyst which itself boils beneath about 120° C. or which under the conditions of reaction, forms a compound that boils at such temperature.

I claim:

1. The process of producing condensation products from urea and formaldehyde which comprises heating a non-acidic mixture of n-butanol, one molecular equivalent of urea and at least two molecular equivalents of aqueous formaldehyde until the reaction has at least reached the methylol urea stage, adding to the solution approximately 0.06% of formic acid based on the anhydrous weight of the starting materials and refluxing for from ½ to 1 hour, reducing the pressure to a point at which the mixture will boil at a temperature below 80° C., distilling substantially all the water from the mixture while replacing the butanol also vaporized, releasing the vacuum and continuing the distillation at atmospheric pressure until a total of approximately two mols of water of reaction have been separated for each mol of urea condensed.

2. The process of producing condensation products from urea and formaldehyde which comprises heating a non-acidic mixture of n-butanol, one molecular equivalent of urea and at least two molecular equivalents of aqueous formaldehyde until the reaction has at least reached the methylol urea stage, adding to the solution not more than 0.1% of formic acid based on the anhydrous weight of the starting materials and refluxing for from ½ to 1 hour, reducing the pressure to a point at which the mixture will boil at a temperature below 80° C., distilling substantially all the water from the mixture while replacing the butanol also vaporized, releasing the vacuum and continuing the distillation at atmospheric pressure until a total of approximately two mols of water of reaction have been separated for each mol of urea condensed.

3. The process of producing condensation products from urea and formaldehyde which comprises heating a non-acidic mixture of n-butanol, one molecular equivalent of urea and at least two molecular equivalents of aqueous foraldehyde until the reaction has at least reached the methylol urea stage, adding to the solution a volatile acid catalyst in such small amounts as will not cause gelling of the reaction mixture when heated up to 117° C. for approximately ten hours, refluxing for a short time, distilling substantially all the water from the mixture at a reduced pressure and at a temperature at which condensation is not considerably advanced, releasing the vacuunm and continuing the distillation until a total of approximately two mols of water of reaction have been separated for each mol of urea condensed.

4. The process of producing condensation products from urea and formaldehyde which comprises heating a non-acidic mixture of one molecular equivalent of urea and at least two molecular equivalents of aqueous formaldehyde in an alcoholic solvent having a boiling point between about 78° C. and 137° C. until the reaction has at least reached the methylol urea stage, adding to the solution a volatile acid catalyst in such small amounts as will not cause gelling of the reaction mixture when heated up to 117° C. for approximately ten hours, refluxing for a short time, distilling substantially all the water from the mixture at a reduced pressure and at a temperature at which condensation is not considerably advanced, releasing the vacuum and continuing the distillation until a total of approximately two mols of water of reaction have been separated for each mol of urea condensed.

5. The process of producing condensation products from urea and formaldehyde which comprises heating a non-acidic mixture of one molecular equivalent of urea and at least two molecular equivalents of aqueous formaldehyde in an alcoholic solvent having a boiling point between about 78° C. and 137° C. until the reaction has at least reached the methylol urea stage, adding to the solution an acid catalyst in such small amounts as will not cause gelling of the reaction mixture when heated up to 117° C. for approximately ten hours, refluxing for a short time, distilling substantially all the water from the mixture at a reduced pressure and at a temperature at which condensation is not considerably advanced, releasing the vacuum and continuing the distillation until a total of approximately two mols of water of reaction have been separated for each mol of urea condensed.

OSKAR R. LUDWIG.